Inventors
WILLIAM S. H. HAMILTON
and KENDALL B. ROWELL

UNITED STATES PATENT OFFICE 2,116,943

STEAM HEATING BOILER CONTROL FOR ELECTRIC LOCOMOTIVES

William S. H. Hamilton, Larchmont, and Kendall B. Rowell, Yonkers, N. Y., assignors to The New York Central Railroad Company, a corporation of New York Application September 4, 1936, Serial No. 99,489

27 Claims. (Cl. 122—448)

This invention relates to feed regulators for steam generating systems, and particularly to feed regulators for controlling the supplies of water and a liquid hydrocarbon fuel to the steam generator of a steam heating or supply system. More particularly the invention relates to a steam generator and regulating means of the character described for installation on an electric locomotive or on a baggage or other car for cooperation with steam heating apparatus of standard cars or coaches to supply steam for heating the same. The invention is especially adapted for use on electric locomotives for supplying steam to the cars of a train being hauled by an electric locomotive substituted for a steam locomotive. The invention is, however, capable of use on other vehicles in stationary plants where the steam is utilized for either heating or power purposes.

One object of the invention is to provide novel means for starting, stopping, regulating and controlling the supply of liquid fuel and combustion air to the boiler heater as occasion may require in the operation of the apparatus so as to ensure economy, efficiency and safe operation of the apparatus under all conditions.

A further object of the invention is to provide novel and improved means for controlling the feed water supply, giving low water protection, automatically governing combustion, and regulating or shutting down the entire steam supply system as circumstances require in the operation of the apparatus.

With these and other objects in view, the invention consists of the features of construction, combination and arrangement of parts, hereinafter fully described and claimed, reference being had to the accompanying drawings, in which:—

Fig. 1 is a diagrammatic plan view showing the working parts and piping of the system.

Figs. 7a and 7b are sectional views of the feed water governor and train line valve, respectively.

Referring now more particularly to Figs. 1 to 7, inclusive, of the drawings, wherein an automatic starting and stopping type of apparatus is shown, 1, 2 and 3 designate respectively and generally the water, steam and air pipings of the feed and control parts of the system, 4 the superheated steam service pipe for supplying steam to the car heaters, 5 the boiler or steam generator and 5a its safety valve or valves; 6, 7, respectively, the feed water and hydrocarbon liquid supply tanks of the system; 8, 9 main and auxiliary burners in the combustion chamber of the boiler, 10 a steam driven water feed pump for supplying water from the tank 6 to the boiler, and 11 a turbo-electro-motor oil pump and blower unit for supplying the liquid fuel and combustion air to the burners, said unit comprising an electric motor 12, a steam turbine 13, an oil pump 14, in association with which is a pressure relief valve 14a, and a blower 15 arranged within a common casing.

Figure 3:
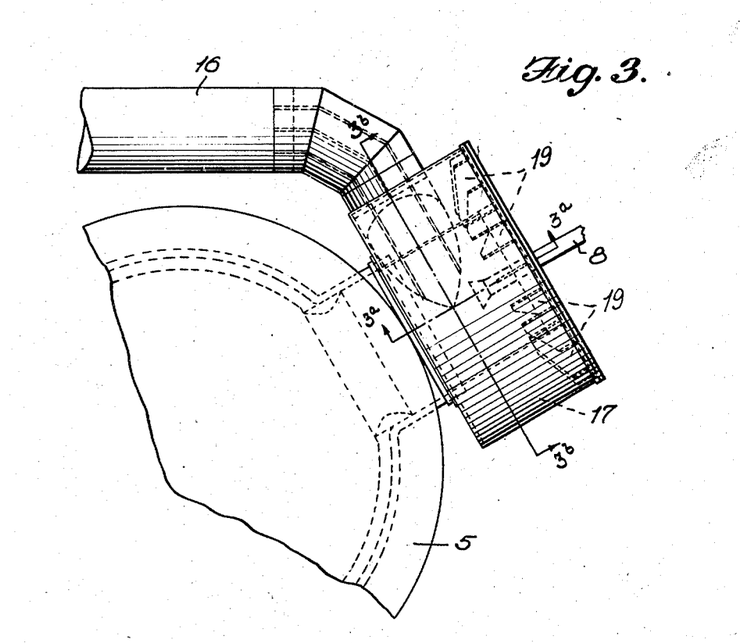
Fig. 3 is a sectional plan view of a portion of the combustion chamber of the boiler showing the burners and the air supply connections from the blower thereto.
Figure 3A:
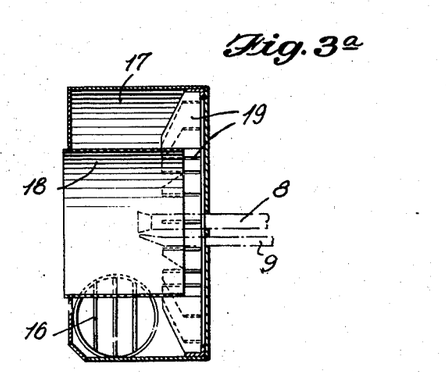
Fig. 3a is a section on line 3a—3a of Fig. 3.
Figure 3B:
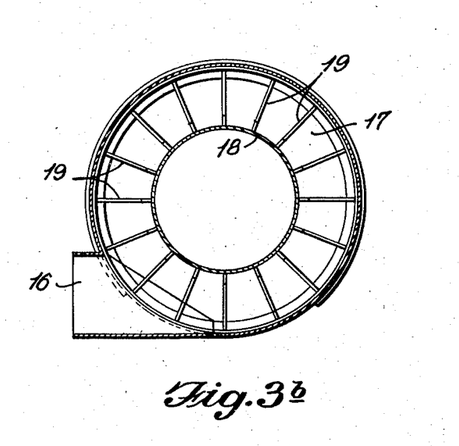
Fig. 3b is a section on line 3b—3b of Fig. 3.

The burner mechanism employed is one of high-low type modified to meet conditions. It consists of the two pressure atomizing burner tips 8 and 9, the former being a main burner tip capable of atomizing most of the fuel delivered at high combustion ratios, and the latter comprising an auxiliary burner or pilot tip small enough to atomize properly the small amount of fuel delivered at very low and idling rates of combustion. Air for combustion is conducted from the blower outlet through a duct 16 to a cylindrical air chamber 17 surrounding the burners, which it enters at one side. In order to distribute the air flow as equally as possible around the burners as it enters the combustion space, the air enters the air chamber near the boiler, circulates around and fills the outer part of the chamber and then enters a second duct 18 of circular cross-section into which the burners project, the axis of which second duct is concentric with the center lines of the burner and the cylindrical air chamber. The air from the first duct 16 entering the cylindrical air chamber 17 flows to an inlet at the outer end of the second duct 18 through passes formed by and between an annular series of baffle plates 19 projecting inwardly from the outer wall of the chamber 17 which is spaced from the inlet end of chamber 18. The baffling action of plates 19 and the outer wall of chamber 17 prevent direct flow of air from one duct to the other and causes the whirling or circling current of air supplied to the chamber 17 from the blower to be converted into straight line streams flowing parallel with the burners and to and through the inner outlet end of the duct 18 with the burner flames into the combustion chamber. The result is an even pressure of air in the cylindrical chamber that feeds air evenly and uniformly to all portions of the second duct and to the combustion chamber whereby the flames are concentrated and splurging of the flames against the side walls of the combustion chamber prevented.

Figure 4:
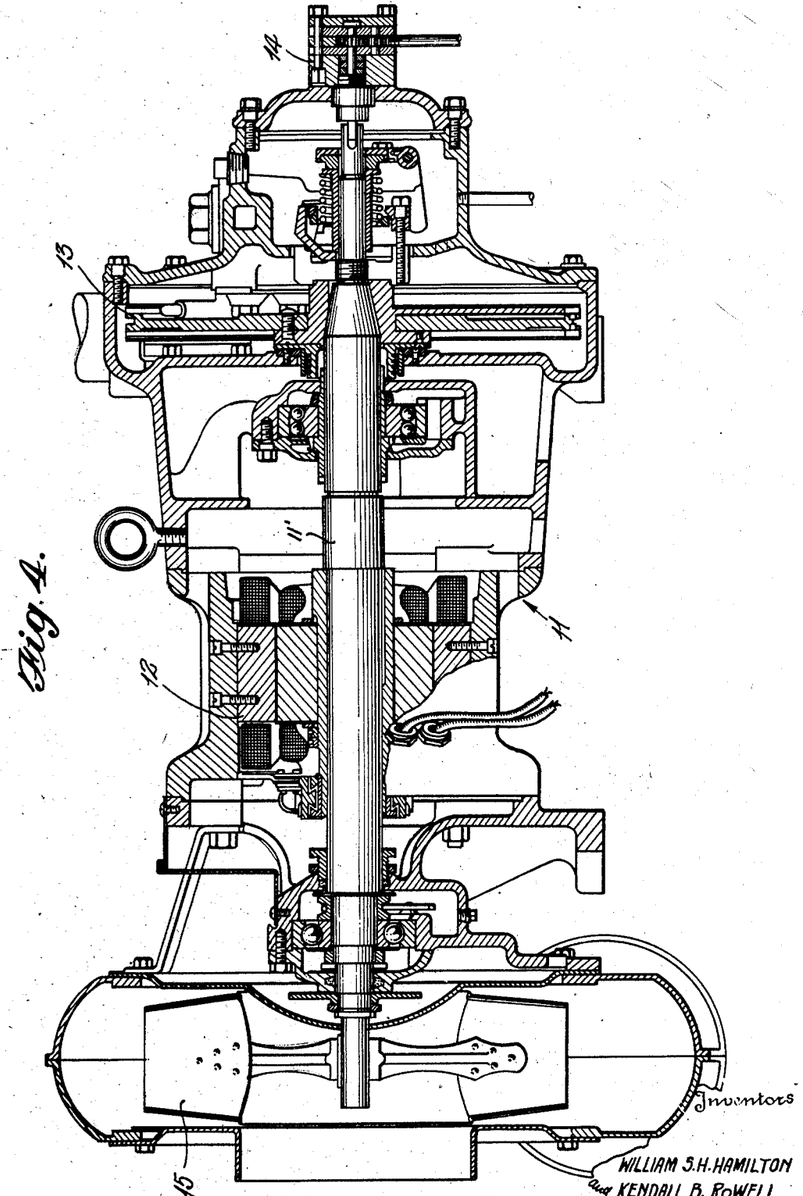
Fig. 4 is a sectional view through the fuel pump, blower and motor.

The blower employed is of the paddle type and the fuel pump is of the gear type. The fuel pump shaft is directly connected to a shaft 11' carrying the blower rotor, the steam turbine rotor and the electric motor armature. In normal operation, the shaft is driven by the turbine, the speed being controlled by automatically throttling the steam supply to the turbine according to the rate of combustion required to maintain boiler pressure. In order to drive the blower set when steam is not available, as in starting a cold boiler, the electric motor is used. This motor has not sufficient power to drive the set at full speed, and steam is therefore admitted to the turbine as soon as sufficient pressure is available. The electric motor is also not depended upon for blower drive, as it is necessary to keep up steam even when power is shut off from the third rail or other source of electric current supply. The combustion control is based upon the fact that air delivered by a blower and fuel oil delivered by a rotary pump both vary directly as the speeds of the shafts. When the fuel pump is driven by the blower shaft there is obtained a fixed ratio between volumes of air and fuel delivered in a unit time, as they are both varied coordinately and concomitantly by changing the speed of their common drive shaft.

Figure 2:
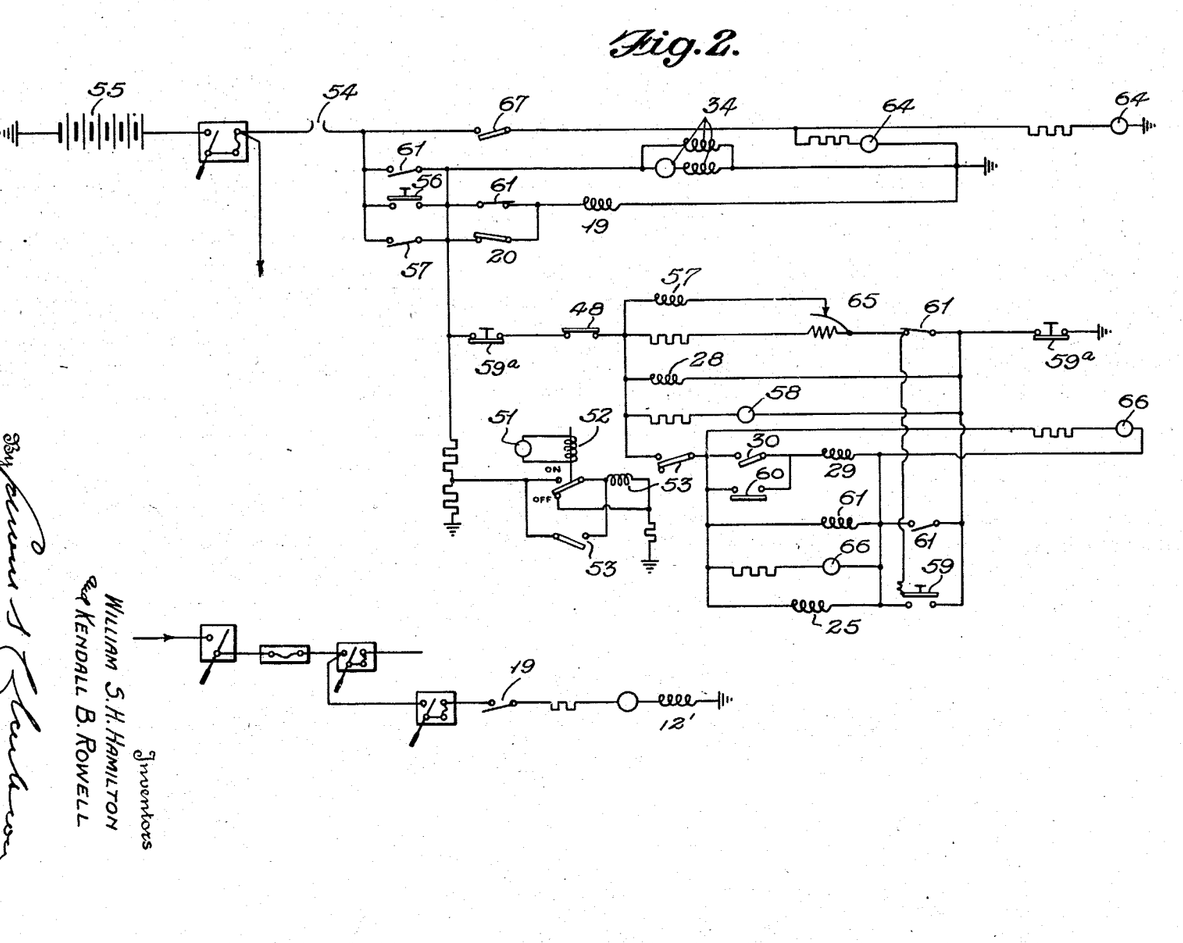
Fig. 2 is a similar view of the wiring of the electric control circuits thereof.

The control circuits for the various parts of the apparatus are shown diagrammatically and in detail in Fig. 2. These circuits are supplied with current from a battery as shown, which battery may be charged from the current source of supply of the locomotive or otherwise. Electric power for the blower motor is controlled for an automatic cut off action by a contactor 19 controlled by a pressure switch 20 as soon as sufficient boiler pressure is available to drive the blower at full speed. The pressure switch 20 is connected directly to the boiler and opens against the resistance of a closure spring on an increase in boiler pressure, closing at a pressure below the opening pressure and below the normal operating range of the boiler. Thus the blower speed is controlled at any speed down to idling by controlling the steam to the turbine.

Figures 5, 6:
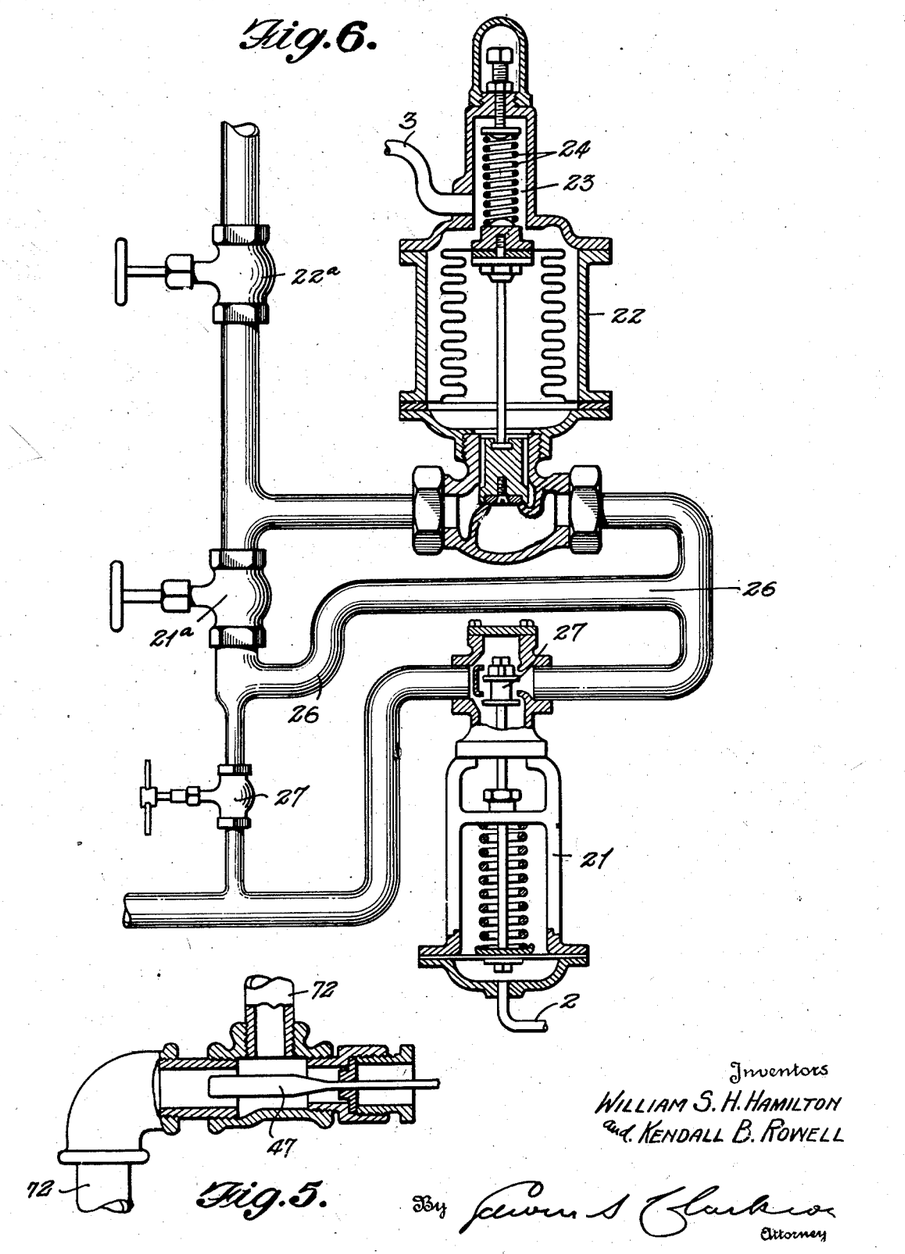
Fig. 5 is a view showing the thermostatic low water cut out sensitive element.
Fig. 6 is a view showing the turbine control valves.
Figure 7:
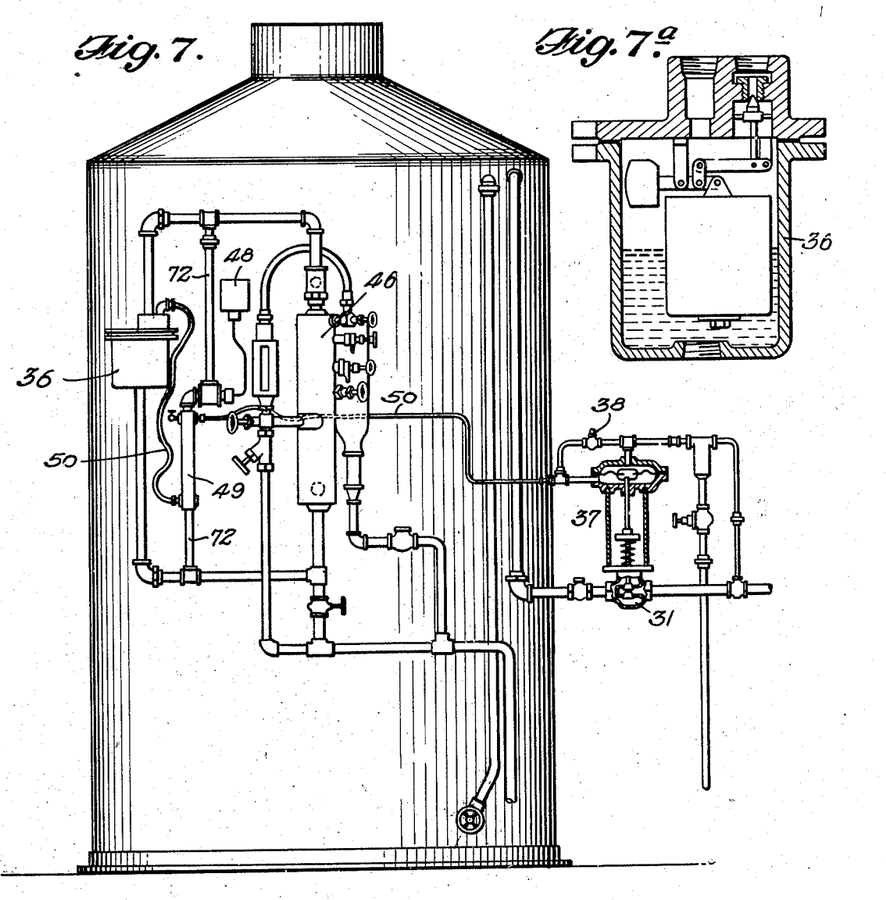
Fig. 7 is a view of the boiler and connections.

Control of steam to the turbine is accomplished by means of a diaphragm operated balanced throttle valve 21 having boiler steam pressure constantly acting, in opposition to spring pressure, on one side of its diaphragm. The valve is wide open if the boiler pressure is low, begins to close as this pressure approaches a value somewhat below the maximum boiler pressure and is completely closed at a higher pressure, still below the maximum boiler pressure. As this valve can move from the wide open position to the closed position in a narrow range of boiler pressure, the full range of combustion control occurs within this same narrow range. Also, the control attains a setting at which the fuel and air supplied to the burner are equivalent to the demand for steam from the boiler, thereby giving a "full floating" characteristic to the combustion control.

In the turbine steam line between the boiler and the automatic turbine throttling valve 21 is a diaphragm or bellows operated stop valve 22, which is held closed by a spring until there is sufficient boiler pressure to operate the turbine at a fair speed. At that pressure, the valve begins to open and will remain open until the boiler pressure falls to a value somewhat below the opening pressure. This valve has an air chamber 23 surrounding its closing spring 24 into which compressed air may be admitted by an electric solenoid valve 25 to assist the spring in closing the valve 22 when the automatic controls, hereinafter described, cause the boiler to shut down. There is provided a by-pass line 26 around the turbine throttling valve 21 in which is arranged a key-needle valve 27 which can be set to pass enough steam to operate the turbine at idling speed when the throttle valve 21 is closed at maximum boiler pressure or at other times. In the steam supply line to the valves 21, 22 is a hand-operated cut out valve 22a and in said line between the valves 21 and 22 is a hand-operated valve 21a which is normally closed to cause the steam to flow successively through said valves 21 and 22, but which may be opened in the event of derangement of valve 22, or in the event it should become necessary to admit steam to the turbine before valve 22 would normally open, to allow steam to flow through valve 21 and the by-pass and the key-valve 27 to operate the turbine. The valve 21 through its control action gives a floating control of the turbine between minimum and maximum speeds. The turbine is equipped with a maximum speed governor, within the casing of the turbine, to limit the turbine speed under maximum steam pressure.

Figures 1, 7B:
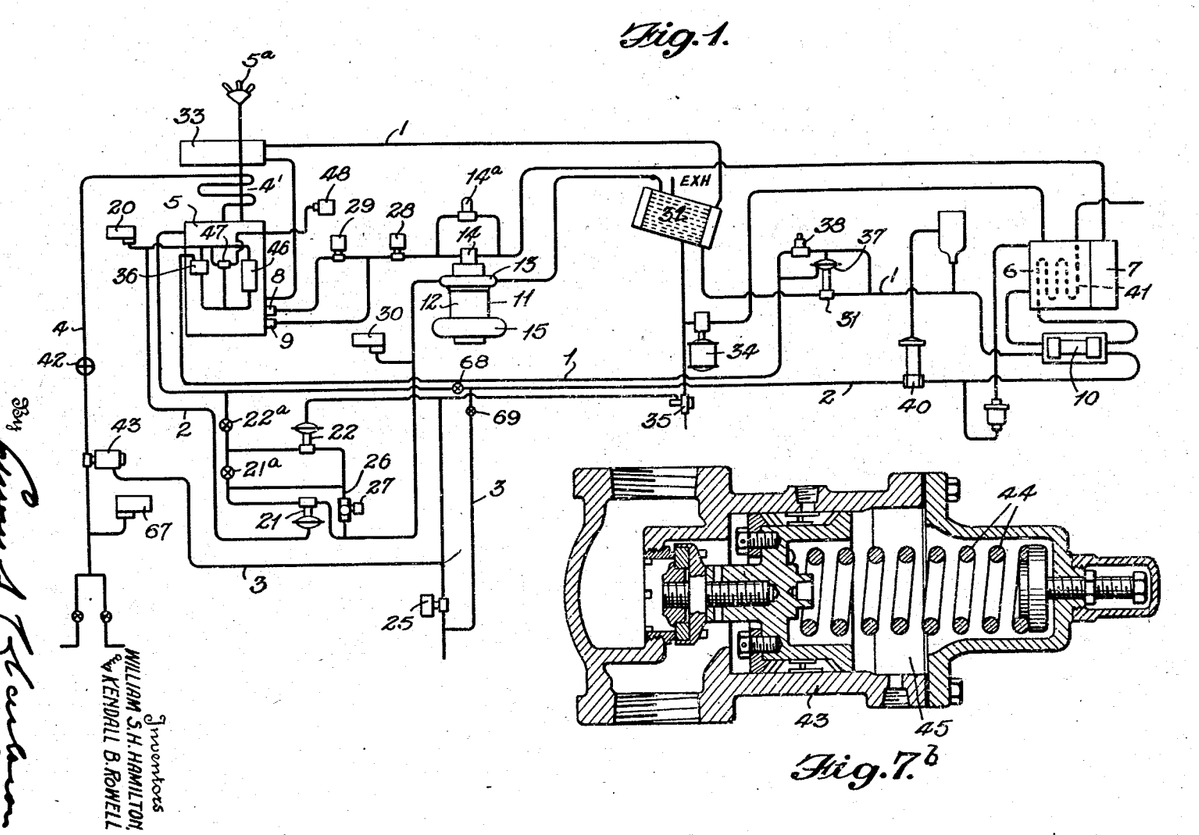

The fuel oil line from the pump is controlled by an electric solenoid valve 28 which is capable of stopping the flow of oil to the burners. Between this valve and the burners the fuel oil line is divided into two branches, one of which goes directly to the pilot burner 9 and the other to another solenoid valve 29 and thence to the main burner 8. The second solenoid valve 29 is closed when the flow of fuel oil is too small for good atomization from the main burner, whereupon all the fuel flows to and through the pilot burner, the pressure rising due to the decreased jet orifice so that good atomization is obtained. This solenoid valve 29 is controlled electrically by a pressure switch 30 having its pressure connection in the steam line to the blower set turbine. When this steam pressure reaches a value corresponding to a turbine speed which produces a flow of fuel oil requiring a larger burner orifice the pressure switch 30 closes, energizes the solenoid valve 29 and opens the branch fuel line to the main burner tip. Conversely, if the turbine steam pressure falls below a predetermined value, the solenoid 29 closes and all of the fuel flows to and through the pilot burner tip. By this means an automatic control over the extreme fuel pressures at the burners is provided to obtain proper atomization by regulation of pressures as the result of increasing or diminishing quantity as the blower pump set speeds up or slows down.

Arranged in the feed water line between the water supply tank and the boiler are successively a feed water control valve 31, a closed type condenser 32, and an economizer or pre-heater 33. The feed water flows through the tubes of this condenser 32 and the exhaust steam from the turbo-blower set flows around these tubes and is condensed. The condensate then flows into a small electrically driven centrifugal pump 34, by which it is pumped back to the water supply tank 6. Under normal conditions for high evaporating rates of the boiler the feed water is capable of absorbing enough heat to condense all of the exhaust turbine steam. The condensate line is fitted with a diaphragm operated condenser drain valve 35 held closed by spring pressure. When magnet valve 25 is deenergized compressed air is admitted for action on the diaphragm of this valve 35 which opens, allowing any condensate remaining in the condenser to drain to the ground.

The feed water control means consist of a float operated valve 36, such as a Strong Simplex boiler feeder, a diaphragm operated balanced valve feed water governor 37 or a Kieley spring closed type of excess pressure pump governor, with pressure chambers on both sides of a diaphragm operating in connection with or against the action of the closing spring, and an adjustable orifice or key-needle valve 38. The feed water governor 37 is placed in the feed water line at a distance from the boiler, or where the water has still to pass through auxiliaries before reaching the boiler, in order that there may be an appreciable difference in pressure between the valve and the boiler when water is flowing. The top diaphragm chamber, or that in which pressure tends to open the valve, is connected to the feed water line just ahead of the valve. The bottom diaphragm chamber is connected to the float on the boiler. The adjustable orifice key-needle valve 38 is connected across the diaphragm of the feed water governor.

When the boiler water level is high, the float valve 36 is closed and therefore the feed line pressure builds up on the bottom of the diaphragm equal to that on top, through the key-needle valve, and the spring closes the feed water governor valve. When the boiler water level falls below normal the float valve opens and allows the pressure on the bottom of the feed water governor diaphragm to drop to that of the boiler, provided the orifice in the key-needle valve is sufficiently small. This key-needle valve may be adjusted to proper position by test and then suitably locked in such position. If this valve be too far open the feed water governor will not open quickly and if the key-needle valve be too nearly closed the feed water governor will not close promptly. By proper adjustment of the valve 38, however, a maximum sensation of action will be obtained. This type of control permits the use of a small float valve and maintains the water level within a narrow range at maximum rates of evaporation, which is necessary in obtaining the best efficiency of the boiler. Feed water is pumped by the reciprocating pump 10 controlled by a conventional type of pump governor 40 so that when the feed water governor is closed the pressure built up behind it acts upon the pump governor to reduce the speed of the pump or stop it.

This feed water system is independent of the automatic electric safety control system and will maintain the normal water level in the boiler whether the boiler be in operation or not, so long as there is appreciable steam pressure. Exhaust steam from the boiler feed pump is passed through a coil 41 in the bottom of the feed water storage tank, which condenses it, avoiding objectionable vapor at the exhaust to atmosphere and reclaiming some heat. This condensate is not reclaimed. The feed water pump can be operated by air pressure when necessary to fill a cold boiler.

In the steam line 4 is arranged a superheater 4', and also arranged in this superheated steam line, between a manual stop valve 42 and branch lines leading to the train connectors at each end of the locomotive, is a piston type automatic train line valve 43 which remains closed under pressure of a spring 44 until the steam pressure reaches a predetermined value, whereupon the valve starts to open. At normal train line pressure the valve is wide open. If the demand for steam is so great that the boiler can not supply it the pressure drop causes the valve 43 to close limiting the boiler pressure reduction at a point where the auxiliaries are still operative. Compressed air is admitted to the valve chamber 45 when the boiler is shut down due to the action of magnet valve 25 opening, thereby closing the automatic train line valve and shutting off steam to the train line. In practice, as this valve 43 does not open until the boiler pressure is quite high it protects the boiler against too great a demand for supply of heating steam until the rate of evaporation is adequate and ensures sufficient pressure to fill the train line quickly. It also prevents loss of boiler pressure in case there should be a broken train line or other excessive demand for steam, and the air shut down feature closes the valve automatically when the boiler is shut down and protects trainmen who may uncouple the train line from injury by escaping steam.

The provision of this control valve 43 also ensures that even under low pressure conditions in the boiler sufficient steam pressure will be provided to operate the turbine and to allow the boiler pressure to build up during a cut off action of the valve 43 under these conditions, thus avoiding the necessity of frequent use of the electric motor, with resultant economy in the use of electric current.

A short section of pipe 72 is connected to the top and bottom of the water column 46 in order that the water level in this pipe will always correspond with the level in the boiler. The water in this pipe 72 remains cool as there is no continuous flow. At a place in the pipe a short distance below the normal water level the sensitive bulb 47 of a thermostatic switch 48 is installed. When the water level is sufficiently high the thermostatic bulb is surrounded by water which is relatively cool, the thermostatic switch 48 being closed, allowing the electric control circuits to be energized and operative. When the water level falls below the desired height the thermostatic bulb becomes exposed to hot water just below the water level or to the steam above the water, and the thermostatic switch 48 opens deenergizing the controls and causing the fire to go out. If the feed water system is in operation it will restore the proper water level and the thermostat 48 will re-close. If desired, a jacket 49 may be arranged to surround the pipe 72 in which the thermostatic bulb is inserted and a connection 50 provided which carries the water from the feed water governor diaphragm through this jacket before it enters the float valve. This water, which is relatively cool, assists in cooling the water which surrounds the thermostat bulb and causes quicker action of the thermostat.

A device is provided for automatically shutting off the fuel supply to the boiler when the burner fire goes out. This comprises a photronic or light sensitive cell 51 suitably arranged to convert radiant energy of light from the boiler flame into an electric current and two relays for controlling the electric boiler circuits. The cell is connected across the coil of a sensitive relay 52 which is so adjusted that when the current from the cell is sufficiently large the relay arm is against the contact denoted "On" and when the current is below a predetermined value the arm is against the contact denoted "Off". The auxiliary relay 53 is so connected that when the sensitive relay 52 is in the "on" position the auxiliary relay coil is energized and two separate arms make contact with separate points. One of these is in the boiler control circuit and permits operation of the boiler. The other short circuits the sensitive relay "on" contacts and holds the auxiliary relay closed when the sensitive relay is open. When the sensitive relay reaches the "off" position, however, the coil of the auxiliary relay is short circuited and the auxiliary relay contacts 53 open, deenergizing the boiler circuits and opening the short circuit around the sensitive relay "on" contacts. The purpose of this arrangement is to maintain the boiler circuits in the operative condition, once established, until the fire is out. The boiler controls are so arranged that a fire may be lit while the sensitive relay is in "off" position. The controls are connected through the auxiliary relay after the fire has been established.

In the primary branch of the control circuits is a circuit breaker 54 through which all control circuits are energized with current from the supply battery 55. Before starting the boiler the battery switch and the circuit breaker 54 are closed. The boiler water level is then checked, in order that the low water thermostatic switch 48 will be closed. Then the start button 56 is pushed. This starts the water condensate pump 34, closes contactor 19 and starts blower set 11, closes a relay 57 and opens magnet valve 28, thereby admitting fuel oil to the auxiliary or pilot burner, and lights pilot light 58. The start button may be released as soon as the pilot light 58 lights, since contact 57 on closing establishes the circuit. The burner is lit by means of a hand torch, inserted in the firebox before the start button is pressed. At this time the photronic safety device will close contacts on relay 53 and run button 59 may be pressed. On the starting of the blower an interlock 60 is closed so that the "run" button establishes a return circuit for the following:

(1) Magnet valve 29 allowing fuel oil to flow to large burner tip;

(2) Magnet valve 25 shutting air off automatic train line valve 43, turbine steam stop valve 22 and condenser drain valve 35; and (3) Running relay 61 opening contacts to the right of start button and starting relay 57 and closing contacts above "start" button and at right of running relay coil 61. This puts pressure switch 20 in control of blower contactor 19, holds the return circuit when "run" button is released, opens relay 57 and provides a contact in a circuit around the "start" button to replace the one that opens with relay 57.

Relay 57 is held closed by the "run" button to allow relay 61 to close before relay 57 and the "run" button open. If relay 61 has closed, relay 57 will open when "run" button is released.

If the proper contacts have closed pilot lights 66, one in each operating cab, will light and stay lit after "run" button is released.

If relay 53 or relay 61 has failed to close and "run" button has not been released within one minute after relay 57 is closed, a time delay relay 65 will open. This opens relay 57 and brings the control back to stop condition.

If boiler pressure is low the burners are now operating at about ⅔ full fire using the electric motor to drive the blower. When the pressure is high enough it opens valve 22 and passes through valve 21 to drive the turbine.

As soon as enough pressure is available to drive the turbine at full speed pressure switch 20 opens, opening contactor 19 shutting power off motor, opening interlock 60 which puts pressure switch 30 in control of magnet valve 29 as stated before. This shuts off large burner tip when fuel oil pressure is low.

The automatic train line valve 43 is now ready to open admitting steam to the train line and closing pressure switch 67 as pressure is built up in the train line, which in turn lights the pilot lights 64, one in each operating cab, indicating that train line pressure is up.

As stated before, low water or fire out will open switch 48 or relay 53, respectively, either of which will open relay 61, returning the whole control to stop condition.

Two "stop" buttons 59a are provided, one in each operating cab. Pressing either of these buttons opens relay 61 and returns the control to stop condition.

At the stop condition valve 25 is deenergized and open, admitting air to the automatic train line valve 43 causing it to close regardless of steam pressure; automatic valve 22, closing it and stopping flow of steam through valve 21 to turboblower, and condenser drain valve 35, opening same to drain any remaining condensate.

It will be observed that cut off of the fuel to the burners upon an initial failure of ignition is effected by the time relay device 65, whereas the cut off of fuel to the burners upon cessation of combustion after ignition of the fuel is effected by the photronic cell 51 and associated relays, whereby a reliable and certain control of the fuel feed is secured to effect a cut off action under either of these conditions. These cut offs are arranged in independent circuits in order to secure independent control actions thereof for the purpose specified.

With the operation of the valves 22, 28 and 29 valve 21 admits steam to the turbine to assist the electric motor of the turbo-motor-blower set, in order to raise boiler steam quickly for rapid forcing of the apparatus into running condition. Valve 22 opens at a pressure of 110 lbs. and pressure switch 20 opens at or near trainline pressure, substantially at 170 lbs.

Hand valves 68 and 69 are provided in the steam and air lines to control the supply of compressed air to the water feed pump and pump governor for operating the same to supply water to fill a cold boiler.

Figure 8:
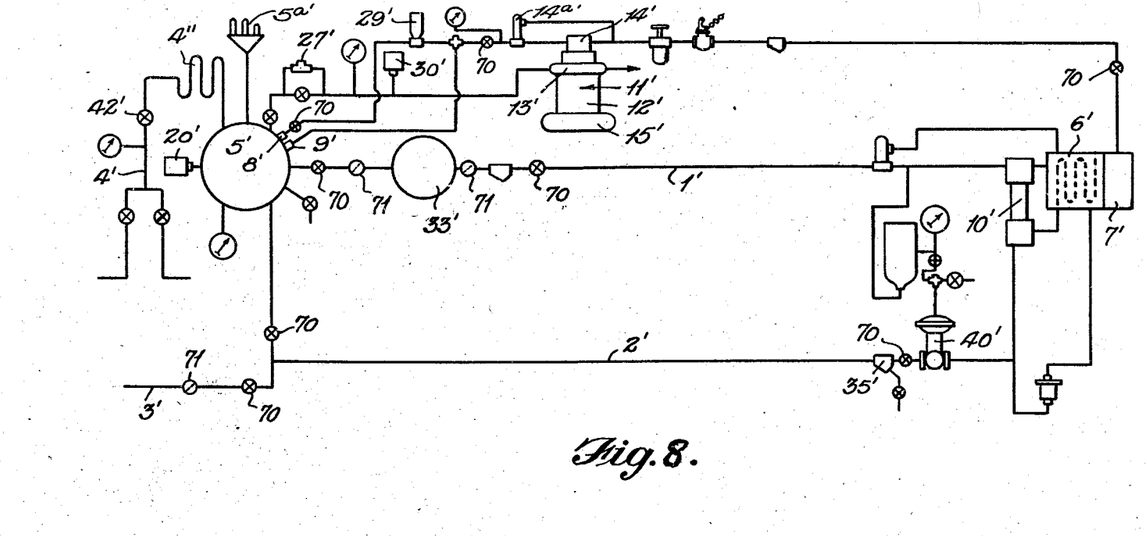
Figs. 8 and 9 are views similar to Figs. 1 and 2 of a modified arrangement for hand control instead of automatic control.
Figure 9:
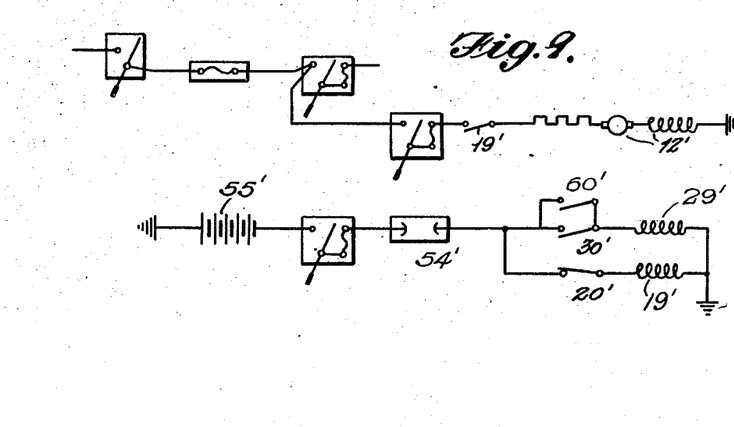

Figs. 8 and 9 show an arrangement for manual instead of automatic control of certain parts of the apparatus, and which eliminates the condenser, the automatic control of feed water level, the low water cut off and the automatic turbine steam control and protection against extinguishing of the fire. The burners, the turbo-motorblower set and automatic control of water line pressure by means of a pump governor are, however, retained the same as in the automatic control system. The parts of the system shown in Figs. 8 and 9 corresponding to those shown in Figs. 1 to 7, inclusive, are designated by correspondingly primed reference characters. In this system of Figs. 8 and 9 the large burner cut out is operated by the turbine steam pressure switch, while the blower motor cut out is operated by the boiler steam pressure switch, and suitable globe and check valves 70 and 71, respectively, are provided in the water, steam and air lines to control the flow of these fluids as required.

From the foregoing description, taken in connection with the drawings, the construction and mode of operation of the apparatus will be readily understood without a further and extended description. While the constructions disclosed are preferred, it will, of course, be understood that changes in the form, arrangement, and details of construction of the parts may be made within the scope of the appended claims without departing from the spirit or sacrificing any of the advantages of the invention.

What we claim is:—

1. In a steam generator, a boiler, a burner for heating the boiler, a pump for supplying fuel to the burner, a blower, a steam turbine for driving the blower, said pump, blower and turbine being coaxially mounted, a power driven starting motor mounted coaxially with the pump, blower and turbine, means responsive to steam pressure supplied to the turbine for controlling the supply of fuel to the burner, and means responsive to boiler pressure for cutting off the power to the starting motor.

2. In a steam generator, a boiler, a burner for heating the boiler, a pump for supplying fuel to the burner, a blower, a steam turbine for cooperatively driving the fuel supplying device and the blower, said pump, blower and turbine being coaxially mounted, an electrically driven starting motor mounted coaxially with the pump, blower and turbine, means responsive to boiler steam pressure for governing the supply of fuel to the burner, and a boiler pressure controlled switch for cutting off the supply of current to the starting motor.

3. In a steam generator, a boiler, main and auxiliary burners for heating the boiler, a device for supplying fuel to said burners, a blower, a steam turbine for cooperatively driving the fuel supplying device and the blower when steam is supplied to the turbine, means responsive to steam pressure supplied for driving the turbine for letting on or cutting off the supply of fuel to the main burner, and means responsive to steam pressure supplied for driving the turbine for cutting off the supply of fuel to both burners.

4. In a steam generating system, a boiler, a burner for heating the boiler, a device for supplying fuel to the burner, a blower, a steam turbine for cooperatively driving the fuel supplying device and the blower, means governed by boiler steam pressure for regulating the supply of steam to the turbine, and means independent of the first-named means responsive to boiler steam pressure for letting on or cutting off the supply of fuel to the burner.

5. In a steam generator, a boiler, a burner for heating the boiler, a device for supplying fuel to said burner, a blower, a steam turbine supplied with steam from the boiler for driving the blower and fuel supply device, means responsive to pressure of steam supplied to the turbine for controlling the supply of fuel to the burner, a steam service line supplied with steam from the boiler, means responsive to steam pressure conditions in the boiler for controlling the supply of steam to the turbine, and means operative for closing communication between the boiler and the steam line upon the reduction of pressure in the boiler to a point below that required to operate the turbine and for establishing communication between the boiler and the service line at boiler pressures above such certain pressure degree.

6. In a steam generator, a boiler, main and auxiliary burners for heating the boiler, a pump for supplying fuel to the burners, a blower for supplying air to the burners, a steam turbine for cooperatively driving the pump and blower, means responsive to boiler steam pressure for controlling the supply of steam to the turbine, means responsive to boiler steam pressure for letting on or cutting off the supply of fuel to the main burner, and means responsive to failure of ignition of the supplied fuel for cutting off the supply of fuel to both burners.

7. In a steam generator, a boiler, a burner for heating the boiler, a pump for supplying fuel to the burner, a blower for supplying air to the burner, a steam turbine for cooperatively driving the pump and blower, an electric motor for initially driving the pump, blower and turbine, means acting upon the generation of steam at a predetermined pressure in the boiler to cut out the electric motor, means responsive to boiler steam pressure to control the supply of steam to the turbine, and means independent of the last-named means for letting on or cutting off the supply of fuel to the burner.

8. In a steam generator, a boiler, a burner for heating the boiler, a pump for supplying fuel to the burner, a blower for supplying air to the burner, a steam turbine for cooperatively driving the pump and blower when steam is supplied thereto, an electric motor for initially driving the pump, blower and turbine for a starting action, means operating upon the generation of steam to a predetermined pressure in the boiler for cutting out the electric motor, means responsive to boiler pressure for controlling the supply of steam to the turbine, and means responsive to pressure of the steam supplied to the turbine for controlling the supply of fuel to the burner.

9. In a steam generator, a boiler, a burner for heating the boiler, a steam service line supplied with steam from the boiler, a pump for supplying fuel to the burner, a blower for supplying air to the burner, a turbine for cooperatively driving the pump and blower when steam is supplied thereto, an electric motor for initially driving the pump, blower and turbine for a starting action, means operative on the generation of steam to a predetermined pressure in the boiler for cutting out the electric motor, means controlled by boiler steam pressure for supplying steam to the turbine for a driving action, means responsive to pressure conditions of steam supplied to the turbine for controlling the supply of fuel to the burner, and means controlled by boiler steam pressure to let on and cut off the supply of steam to the service line at predetermined high and low boiler steam pressures.

10. In a steam generator, a boiler, main and auxiliary burners for heating the boiler, pump means for supplying fuel to the burners, a blower for supplying air to the burners, a turbine for cooperatively driving the pump and blower when steam is supplied thereto, means governed by boiler steam pressure for supplying steam to the turbine, means governed by boiler steam pressure for letting on or cutting off the supply of fuel to the main burner, and means responsive to a fire out condition in the combustion chamber of the boiler for cutting off the supply of fuel to both burners.

11. In a steam generator, a boiler, a burner for heating the boiler, a pump for supplying fuel to the burner, a blower for supplying air to the burner, a turbine for cooperatively driving the pump and blower when steam is supplied thereto, means for initially driving the oil pump, blower and turbine for a starting action, means governed by boiler steam pressure for supplying steam to the turbine, means responsive to pressure conditions of the generated steam for letting on and cutting off the supply of fuel to the burner, and means operative under a predetermined boiler condition incident to a working failure in steam generating action for automatically cutting off the supply of fuel to the burner and stopping the action of the oil pump, blower and turbine.

12. In a steam generator, a boiler, main and auxiliary burners for heating the boiler, devices for supplying fuel and air simultaneously in fixed ratio to the burners, a steam turbine for simultaneously operating said devices, and means dependent upon the pressure of steam supplied to the turbine and its rate of speed for governing the supply of fuel so as to supply fuel to the auxiliary burner alone or to both burners.

13. In a steam generator, a boiler, main and auxiliary burners for heating the boiler, devices for supplying fuel and air simultaneously in fixed ratio to the burners, a steam turbine for simultaneously operating said devices, and electrical means responsive to the pressure of steam supplied to the turbine for cutting out the supply of fuel to the main burner without cutting out the supply of fuel to the auxiliary burner when the steam pressure reaches a predetermined high degree.

14. In a steam generator, a boiler, main and auxiliary burners for heating the boiler, devices for supplying fuel and air simultaneously in fixed ratio to the burner, a steam turbine for simultaneously operating said devices, an electrical motor for operating said devices for a starting action, means operative on the generation of a predetermined degree of steam pressure in the boiler for cutting out the electric motor and supplying steam to the turbine, and electrical means operatively dependent upon the pressure of steam supplied to the turbine for governing the supply of fuel so as to supply fuel to the auxiliary burner alone or to both burners.

15. In a steam generator, a boiler, a burner for heating the boiler, concurrently driven and coaxially mounted means for supplying fuel and air in a fixed ratio to the burner, a steam turbine for driving said means, an electric motor for driving said means, means for supplying steam from the boiler to the turbine, means dependent upon boiler pressure to control the supply of current to the motor and govern the supply of steam to the turbine, and pressure controlled means independent of the aforesaid means for controlling the supply of fuel to the burner.

16. In a steam generator, a boiler, main and auxiliary burners for heating the boiler, a turbo-blower-pump unit for supplying fuel and air to the burners at fixed ratio and in volume dependent normally upon the speed of said unit, means for supplying steam from the boiler to the unit, and means operating independent of the unit and upon the steam supply to the unit reaching predetermined high and low pressures for regulating the amount of fuel and air supplied to the burners by the unit and letting on or cutting off the supply of fuel to the main burner.

17. In a steam generator, a boiler, a burner for heating the boiler, concurrently operated and coaxially mounted devices for supplying fuel and air to the burner, a steam turbine mounted coaxially with said devices for driving the same, a pressure controlled throttle valve governing the supply of steam to the turbine, and a combined pressure controlled and electrically operated stop valve governing the supply of steam to the turbine.

18. In a steam generator, a boiler, a burner for heating said boiler, a device for supplying fuel to said burner, a blower, an electric motor for driving the blower, a steam turbine driven by live steam from the boiler for driving said blower with said motor when steam is supplied to said turbine, said device, blower, motor and turbine being coaxially mounted for supplying fuel and air to the burner in fixed ratio, means responsive to boiler steam pressure for governing the supply of steam to the turbine and cutting the electric motor out of action at a predetermined boiler pressure and predetermined speed of said steam turbine, and pressure controlled means independent of the aforesaid means for letting on or cutting off the supply of fuel to the burner.

19. In a steam generator, a boiler, a burner mechanism having a small burner orifice and a larger burner orifice, concurrently and coaxially driven means for supplying fuel and air in fixed ratio to the burner orifices, and means for controlling the delivery of the fuel and air supplied by the driven means to the small burner orifice alone or to both burner orifices responsive to predetermined variations in the boiler pressures and to the speed of the driven means.

20. In a steam generator, a boiler, a burner for heating the boiler, means for feeding fuel to the burner, pneumatic pressure producing means and a valve means differentially responsive to varying boiler pressures and a counteracting predetermined pneumatic pressure supplied by said means for governing the feed of fuel to the burner.

21. In a steam generator, a boiler, a burner for heating the boiler, fuel supplying means including a steam turbine for supplying fuel to the burner, a water supply tank, a pump for supplying water therefrom to the boiler, a condenser in the line of feed of water from the pump to the tank for condensing the exhaust steam from the turbine, and a pump for collecting the water of condensation from the condenser and discharging the same directly back into the tank, and a pressure controlled governor in the line of feed between the condenser and tank and controlling the flow of water from the tank to the boiler.

22. In a steam generator, a boiler, a source of water supply to the boiler, a pump for supplying water therefrom to the boiler, a feed water governor in the line of flow of the water between the tank and the boiler, controlled by a device sensitive to boiler water height and operated by boiler and feed line pressures, and a pump governor controlled by pressure conditions of the feed water governor for regulating the speed of the pump.

23. In a steam generator, a boiler, a source of water supply to the boiler, a pump for supplying water therefrom to the boiler, a pressure controlled feed water governor in the line of flow of the water between the tank and boiler, said governor embodying a flow controlling valve controlled by a diaphragm or bellows exposed to feed line and boiler pressures on opposite sides thereof and a valve governing the relative pressures responsive to boiler water level, and a pump governor controlled by pressure conditions of the feed water governor for regulating the speed of the pump.

24. In a steam generator, a boiler, a burner mechanism for heating the boiler, a concurrently operated fuel feed device, blower, electric motor and steam turbine for supplying a constant ratio by volume of fuel and air to the burner, means for supplying current to the electric motor to drive the same, means for supplying steam from the boiler to drive the turbine, means operated at predetermined boiler steam pressures for supplying steam to drive the turbine at speeds dependent upon the boiler pressures and to vary the pressure of the fuel delivered to the burner mechanism at different turbine speeds, and means for controlling the supply of current to the motor to allow the motor to operate with the turbine after steam up to a predetermined pressure has been admitted to the turbine and cutting off the supply of current to the motor when the steam supplied to the turbine exceeds such predetermined pressure to a definite degree.

25. In a steam generator, a boiler, a burner for heating the boiler, a device for supplying fuel to the burner, a steam turbine for driving said device, and means controlled by boiler steam pressures for supplying steam to the turbine to vary its speed and the fuel feed action, said means including a pressure closed throttle valve governing the supply of steam to the turbine, a pressure opened stop valve governing the supply of steam to the turbine, and electrically operated means acting upon a predetermined reduction of boiler pressure to effect the closing of said stop valve.

26. In a steam generator, a boiler, a burner for heating the boiler, a pump for supplying fuel to the burner, a blower for supplying air to the burner, a steam turbine supplied with steam from the boiler for cooperatively driving the pump and blower, an electric motor for driving the pump and blower, means for throwing the motor into action in the absence of steam pressure sufficient to operate the turbine and for throwing the motor out of action in the presence of steam pressure sufficient to operate the turbine, means controlled by boiler steam pressure for supplying steam to the turbine in inverse ratio to boiler pressure, a service line supplied with steam from the boiler, means responsive to pressure conditions of steam supplied to the turbine for regulating the supply of fuel to the burner, and means operative for closing communication between the boiler and the steam line upon the reduction of pressure in the boiler to a point below that required to operate the turbine and for establishing communication between the boiler and the service line at boiler pressures above such certain pressure degree.

27. In a steam generator, a boiler, a burner for heating the boiler, a pump for supplying fuel to the burner, a blower for supplying air to the burner, a steam turbine for cooperatively driving the pump and blower, an electrical motor for initially driving the pump, blower and turbine, said pump, blower, turbine and electrical motor being coaxially mounted for supplying fuel and air to the burner in fixed ratio, means acting upon the generation of steam at a predetermined pressure in the boiler to cut out the electrical motor, means responsive to boiler steam pressure to control the supply of steam to the turbine, and means independent of the last-named means for letting on or cutting off the supply of fuel to the burner.

WILLIAM S. H. HAMILTON.
KENDALL B. ROWELL.